(12) United States Patent
Fu et al.

(10) Patent No.: US 11,194,200 B2
(45) Date of Patent: Dec. 7, 2021

(54) LIQUID CRYSTAL DISPLAY PANEL AND PREPARATION METHOD THEREFOR

(71) Applicant: CHENGDU CEC PANDA DISPLAY TECHNOLOGY CO., LTD., Chengdu (CN)

(72) Inventors: Xingkai Fu, Chengdu (CN); Guidong Yang, Chengdu (CN); Yinghui Chen, Chengdu (CN); Weiwei Li, Chengdu (CN)

(73) Assignee: CHENGDU CEC PANDA DISPLAY TECHNOLOGY CO., LTD., Chengdu (CN)

( * ) Notice: Subject to any disclaimer, the term of this patent is extended or adjusted under 35 U.S.C. 154(b) by 55 days.

(21) Appl. No.: 16/756,919

(22) PCT Filed: Mar. 23, 2020

(86) PCT No.: PCT/CN2020/080716
§ 371 (c)(1),
(2) Date: Apr. 17, 2020

(87) PCT Pub. No.: WO2021/031559
PCT Pub. Date: Feb. 25, 2021

(65) Prior Publication Data
US 2021/0173267 A1 Jun. 10, 2021

(30) Foreign Application Priority Data
Aug. 20, 2019 (CN) .......................... 201910768109.2

(51) Int. Cl.
*G02F 1/1362* (2006.01)
*G02F 1/1343* (2006.01)
*G02F 1/1337* (2006.01)

(52) U.S. Cl.
CPC ...... *G02F 1/136222* (2021.01); *G02F 1/1337* (2013.01); *G02F 1/134372* (2021.01); *G02F 1/136209* (2013.01); *G02F 1/136286* (2013.01)

(58) Field of Classification Search
None
See application file for complete search history.

(56) References Cited

FOREIGN PATENT DOCUMENTS

| CN | 101059627 A | 10/2007 |
|---|---|---|
| CN | 101382713 A | 3/2009 |
| CN | 105223727 A | 1/2016 |

OTHER PUBLICATIONS

Chinese Office Action, Application No. 201910768109.2, dated Sep. 9, 2020.

(Continued)

*Primary Examiner* — Richard H Kim
(74) *Attorney, Agent, or Firm* — MacMillan, Sobanski & Todd, LLC

(57) ABSTRACT

A liquid crystal display panel and a preparation method therefor are provided, including: an array substrate and a color filter substrate arranged opposite; the array substrate and the color filter substrate are correspondingly provided with a pixel region, during display the pixel region has an alignment dark fringe caused by photo-alignment, and the alignment dark fringe includes a dark fringe branch line located at an edge of the pixel region, wherein the color filter substrate is provided with a common electrode and a black matrix configured to define the pixel region, the array substrate is provided with a main pixel electrode and an edge voltage source, the edge voltage source is located at an edge of the pixel region and below the black matrix.

20 Claims, 5 Drawing Sheets

(56) References Cited

OTHER PUBLICATIONS

Chinese Office Action, Application No. 201910768109.2, dated Jan. 18, 2021.

LIQUID CRYSTAL DISPLAY PANEL AND PREPARATION METHOD THEREFOR

PRIORITY

This application is a U.S. national application of the international application number PCT/CN2020/080716 filed on Mar. 23, 2020 and claiming priority of Chinese application CN 201910768109.2 filed on Aug. 20, 2019 the contents of all of which are incorporated herein by reference.

TECHNICAL FIELD

The present disclosure relates to the field of liquid crystal display, in particular to a liquid crystal display panel and a preparation method therefor.

BACKGROUND ART

The transmittance of the liquid crystal display panel plays an extremely important role in the overall display performance of the liquid crystal display panel, and the higher the transmittance is, the higher the displayable brightness of the liquid crystal display panel is, and the lower the brightness of the backlight can be, consequently the product cost is reduced, therefore, efforts are constantly made in the industry to improve the transmittance of the liquid crystal display panel.

In the prior art, in order to enlarge the viewing angle of the liquid crystal display panel, the multi-domain vertical alignment technique is usually adopted, and UV light (ultraviolet light) is used to irradiate an alignment film for performing photo-alignment. FIG. 1 is a schematic view showing an arrangement direction of liquid crystal molecules within a pixel region provided in the prior art, FIG. 2 is a structural schematic view of an alignment dark fringe in the pixel region provided in the prior art, FIG. 3 is a cross-sectional view of a structure of a liquid crystal display panel corresponding to FIG. 2, and referring to FIG. 1 to FIG. 3, an array substrate 100 and a color filter substrate 200 are arranged opposite to each other, and are correspondingly provided with a pixel region 300, wherein the pixel region 300 is divided into a plurality of domains, and liquid crystal molecules 500 within each domain have different tilt directions.

However, in the liquid crystal display panel in which the vertical alignment technology using ultraviolet light for alignment is adopted, as an overlapped part between a color filter and a black matrix 21 on the color filter substrate 200 forms a raised horn-like structure at an edge of the pixel region 300, and a common electrode 22 on the color filter substrate 200 is in integral and full coverage, and it completely covers an area of a main pixel electrode 11 on the array substrate 100, directions of electric field lines within the pixel region 300 are obliquely diverged from the main pixel electrode 11 to the common electrode 22 at the black matrix 21 in the vicinity of edge of the pixel region 300, and an oblique electric field at the edge will cause liquid crystal molecules at the edge of the pixel to form an arrangement form that is unfavorable for light transmission, i.e., to form an alignment dark fringe 400, thereby significantly affecting the transmittance of the liquid crystal display panel.

SUMMARY

The present disclosure provides a liquid crystal display panel that can eliminate part of alignment dark fringes within a pixel region, and improve the overall transmittance of the liquid crystal display panel.

The present disclosure provides a liquid crystal display panel, including: an array substrate and a color filter substrate arranged opposite to each other;

wherein the array substrate and the color filter substrate are correspondingly provided with a pixel region, during display, the pixel region has an alignment dark fringe caused by photo-alignment, and the alignment dark fringe includes a dark fringe branch line located at an edge of the pixel region, the color filter substrate is provided with a common electrode and a black matrix configured to define the pixel region, the array substrate is provided thereon with a main pixel electrode and an edge voltage source, the edge voltage source is located at an edge of the pixel region and below the black matrix, an absolute value of a voltage between the edge voltage source and the common electrode is greater than an absolute value of a voltage between the main pixel electrode and the common electrode, and the edge voltage source is configured to change a direction of edge electric field lines at the position of the dark fringe branch line so as to eliminate the dark fringe branch line.

Optionally, the color filter substrate is further provided thereon with a color filter, an overlapped part between the color filter and the black matrix forms a raised horn-like structure, and the edge voltage source is located below the horn-like structure.

Optionally, the edge voltage source includes a sub-pixel electrode, wherein each of the sub-pixel electrode and the main pixel electrode is a transparent conductive thin film covering the array substrate.

Optionally, the sub-pixel electrode is completely covered by the black matrix.

Optionally, a gap is formed between an edge of the main pixel electrode and an edge of the sub-pixel electrode, and a center line in a width direction of the gap coincides with an edge line of the black matrix.

Optionally, the edge line of the black matrix is an inner edge line of the black matrix located inside the pixel region.

Optionally, the black matrix is in an inverted trapezoidal shape, and the edge line of the black matrix is an intersection line formed by an upper base having a larger width and legs of the inverted trapezoid shape.

Optionally, polarity and timing of voltages of the main pixel electrode and the sub-pixel electrode are consistent with those of the voltage of the common electrode, and an absolute value of the voltage of the sub-pixel electrode is higher than an absolute value of the voltage of the main pixel electrode.

Optionally, in a white state, the absolute value of the voltage of the sub-pixel electrode is no less than 1.5 times the absolute value of the voltage of the main pixel electrode.

Optionally, the array substrate is provided thereon with scan lines and main data lines, wherein a plurality of the scan lines and a plurality of the main data lines are arranged in a crossed manner to define the pixel regions; and optionally, the sub-pixel electrode is a strip-shaped electrode, wherein the strip-shaped electrode is arranged close to the main data lines and in parallel to the main data lines.

Optionally, the main pixel electrode provides voltage signal by the main array switch and the sub-pixel electrode provides voltage signal by the sub-array switch; and optionally, the array substrate is further provided thereon with a sub-data line, wherein the sub-data line is located within the pixel region and arranged parallel to the main data lines, gates of the main array switch and the sub-array switch are connected with the same scan line, a source of the main array switch is connected with the respective main data line, and a source of the sub-array switch is connected with the sub-data line.

Optionally, the alignment dark fringe further includes a first dark fringe main line located at a boundary of alignment domains at the center of the pixel region, wherein the first dark fringe main line is parallel to the main data lines, and the sub-data line coincides with the first dark fringe main line.

Optionally, the sub-pixel electrode includes a first sub-pixel electrode and a second sub-pixel electrode located at two sides of the pixel region, wherein the first sub-pixel electrode and the second sub-pixel electrode are connected with a metal connection layer through interlayer vias, respectively.

Optionally, the alignment dark fringe further includes a second dark fringe main line located at a boundary of alignment domains at the center of the pixel region, wherein the second dark fringe main line is parallel to the scan lines, and the metal connection layer coincides with the second dark fringe main line.

Optionally, the metal connection layer and the scan lines are formed from the same metal in the same process.

The present disclosure further provides a preparation method for a liquid crystal display panel, including steps of:

providing an array substrate and a color filter substrate arranged opposite to each other, correspondingly providing a pixel region on the array substrate and the color filter substrate, wherein during display, the pixel region has an alignment dark fringe caused by photo-alignment, and the alignment dark fringe includes a dark fringe branch line located at an edge of the pixel region;

providing a common electrode, a color filter and a black matrix which is configured to define the pixel region on the color filter substrate; and providing a main pixel electrode and an edge voltage source on the array substrate, wherein the edge voltage source is disposed at the edge of the pixel region and below the black matrix, and when in use, an absolute value of a voltage between the edge voltage source and the common electrode is greater than an absolute value of a voltage between the main pixel electrode and the common electrode, and the edge voltage source is configured to change a direction of edge electric field lines at the position of the dark fringe branch line so as to eliminate the dark fringe branch line.

Optionally, a color filter is further provided on the color filter substrate, such that an overlapped part between the color filter and the black matrix forms a raised ox horn structure, and the edge voltage source is disposed at an edge position of the pixel region and located below the ox horn structure.

Optionally, the edge voltage source is provided to include a sub-pixel electrode, wherein each of the sub-pixel electrode and the main pixel electrode is provided as a transparent conductive thin film covering the array substrate.

Optionally, the sub-pixel electrode is provided to be completely covered by the black matrix.

Optionally, a gap is provided between an edge of the main pixel electrode and an edge of the sub-pixel electrode, and a center line in a width direction of the gap is provided to coincide with an edge line of the black matrix.

In the liquid crystal display panel provided in the embodiments of the present disclosure, by adding an edge high-voltage source at the edge position of the pixel region so as to excite an additional electric field, the additional electric field and the original edge electric field lines form the total electric field having the direction consistent to that of the electric field of the opening part, by the vector recombination mechanism, so that the liquid crystal molecules are in a more ordered arrangement, part of the alignment dark fringes at the edge positions of the pixel region thus can be eliminated, and the overall transmittance of the liquid crystal display panel is improved.

BRIEF DESCRIPTION OF DRAWINGS

In order to more clearly illustrate technical solutions in the present disclosure or the prior art, accompanying drawings needed to be used in description of the embodiments or the prior art will be introduced briefly below. Apparently, the accompanying drawings in the description below merely show some embodiments of the present disclosure, and those ordinarily skilled in the art still could obtain other accompanying drawings in light of these accompanying drawings, without inventive effort.

REFERENCE SIGNS

Figure 1:
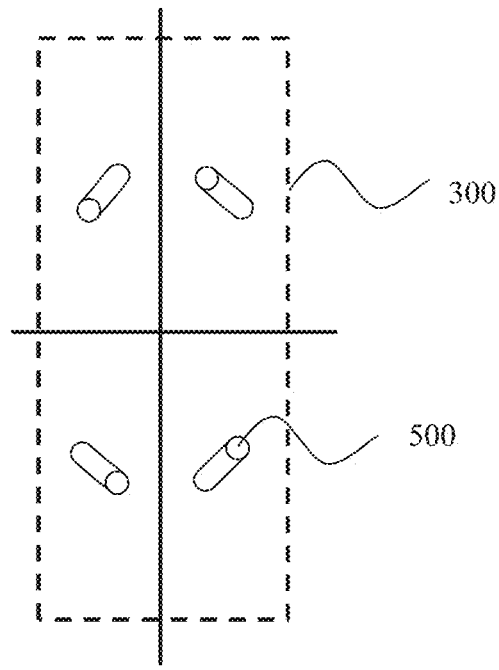
FIG. 1 is a schematic view showing arrangement directions of liquid crystal molecules within a pixel region provided in the prior art.

100—array substrate;
11—main pixel electrode;
12—edge voltage source;
120—sub-pixel electrode;
121—first sub-pixel electrode;
122—second sub-pixel electrode;
13—gap;
14—scan line;
15—main data line;
16—sub-data line;
17—main array switch;
18—sub-array switch;
19—metal connection layer;
191—interlayer via;
200—color filter substrate;

21—black matrix;
22—common electrode;
300—pixel region;
400—alignment dark fringe;
41—dark fringe branch line;
42—first dark fringe main line;
43—second dark fringe main line;
500—liquid crystal molecule.

DETAILED DESCRIPTION OF EMBODIMENTS

In order to make objects, technical solutions and advantages of the present disclosure clearer, the technical solutions in the present disclosure will be described clearly and completely below in connection with accompanying drawings in the present disclosure, and apparently, the embodiments described are some but not all embodiments of the present disclosure. All other embodiments obtained by those ordinarily skilled in the art based on the embodiments of the present disclosure without inventive effort shall fall within the scope of protection of the present disclosure.

It should be noted that the principle of the vertical alignment ("VA" for short) technology of the liquid crystal display panel is that liquid crystal molecules are aligned substantially perpendicular to a panel surface in a state where no electric field is applied, and the liquid crystal molecules are tilted and change their states when an electric field is applied. In order to control a tilt direction of the liquid crystal molecules when the electric field is applied, it may be designed that protrusions and slits are provided on the liquid crystal panel, and a slightly tilted state and a stable state of the liquid crystal molecules are realized by changing shapes (forms) of the protrusions and slits. When the electric field is applied, the liquid crystal molecules near the protrusions and the slits start to be tilted first, and then following the domino effect, the other liquid crystal molecules are pushed over.

Rubbing alignment or photo-alignment (optical alignment) is usually used for controlling an alignment direction. Because that the rubbing alignment may cause the problems of static electricity and particle contamination, and that the rubbing alignment can only be performed in one horizontal direction, the rubbing alignment is unsuitable for multi-domain vertical alignment ("MVA" for short) that requires an enlarged viewing angle. The photo-alignment is a non-contact alignment technology, by which a tilt angle is formed by irradiating an alignment film of photosensitive high polymer with linearly polarized light.

Due to dual effects from photo-alignment on two sides of TFT (Thin Film Transistor) and CF (Color Filter) and ITO (Indium Tin Oxide) edge electric field, a dark fringe will appear when a pixel is in a white state. The formation of dark fringes is closely related to the number of alignment regions. The liquid crystal molecules have the same initial alignment angle in the same alignment region, and the liquid crystal molecules can be tilted towards the initial alignment angle after a voltage is applied thereto, but the initial alignment angles are different in different alignment regions. Due to the domino effect of the liquid crystal molecules, the liquid crystal molecules are tilted towards the alignment direction, the liquid crystal molecules between two alignment regions is oriented non-uniformly due to being affected by the alignment directions at two sides, and the liquid crystal molecules between the two regions enter a disordered state. A continuously-varying arrangement form of liquid crystal molecules between two alignment states will be formed between the two alignment regions and regions nearby because of the elastic continuous medium characteristic of liquid crystal molecules, and these arrangement forms does not match (light) polarization characteristics of a polarizer, consequently the dark fringe is formed during display.

In the above, in the four-domain vertical alignment technology, a pixel region is divided into four domains with different alignments, so that the dark fringe formed within the pixel region is usually in the shape of a clockwise swastika or counterclockwise swastika, generally called as an alignment dark fringe, which will reduce the transmittance of the liquid crystal display panel.

The present disclosure will be described below with reference to accompanying drawings in combination with specific embodiments.

Figure 4:
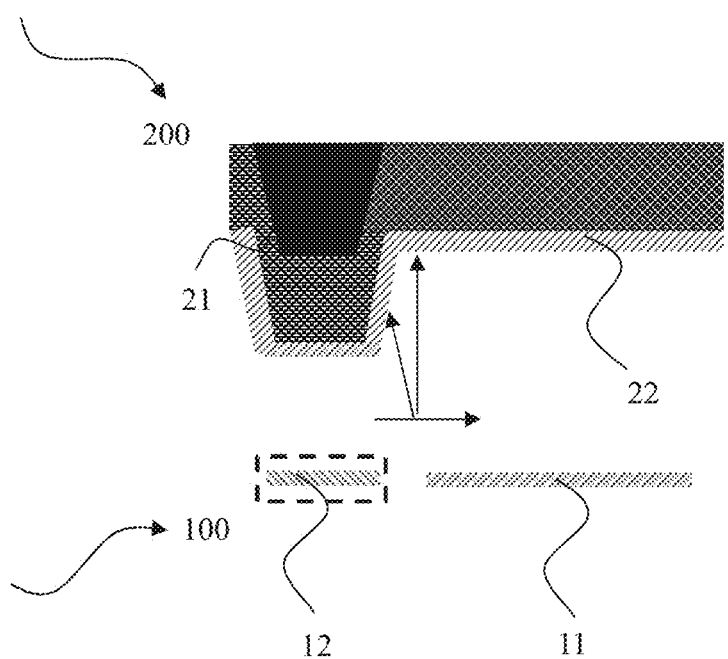
FIG. 4 is a cross-sectional view showing a local structure of a pixel region of a liquid crystal display panel provided in an embodiment of the present disclosure.
Figure 5:
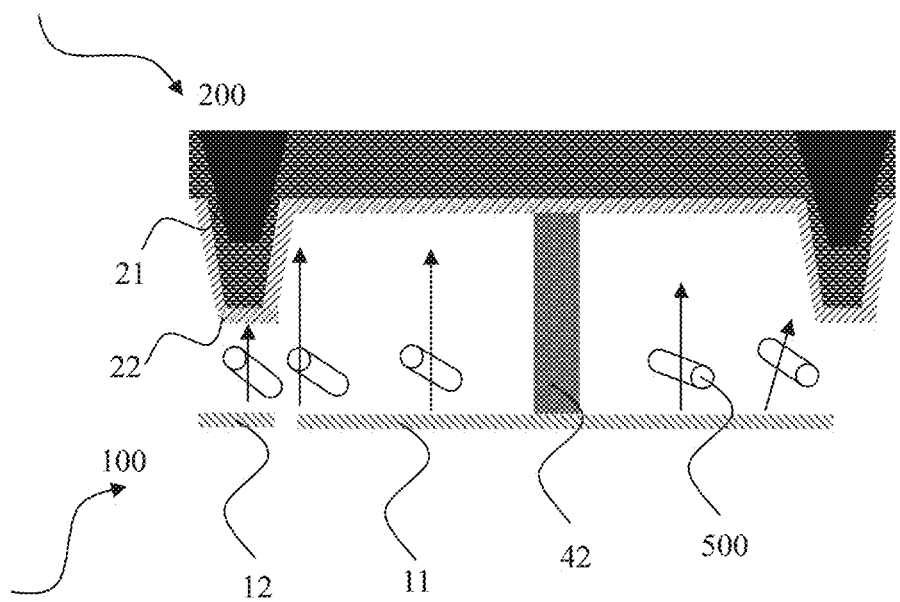
FIG. 5 is a cross-sectional view of a pixel region of a liquid crystal display panel provided in an embodiment of the present disclosure.

FIG. 4 is a cross-sectional view showing a local structure of a pixel region of a liquid crystal display panel provided in an embodiment of the present disclosure, FIG. 5 is a cross-sectional view showing a structure of a pixel region of a liquid crystal display panel provided in an embodiment of the present disclosure. Referring to what is shown in FIG. 4 and FIG. 5, the present disclosure provides a liquid crystal display panel, which may include: an array substrate 100 and a color filter substrate 200 that are arranged opposite to each other; wherein the array substrate 100 and the color filter substrate 200 may be correspondingly provided with a pixel region 300, during display, the pixel region 300 may have an alignment dark fringe 400 caused by photo-alignment, wherein the alignment dark fringe 400 may include a dark fringe branch line 41 located at an edge of the pixel region 300, the color filter substrate 200 may be provided thereon with a common electrode 22 and a black matrix 21 which is configured to define the pixel region 300, the array substrate 100 may be provided thereon with a main pixel electrode 11 and an edge voltage source 12, wherein the edge voltage source 12 may be located at an edge of the pixel region 300 and below the black matrix 21, an absolute value of a voltage between the edge voltage source 12 and the common electrode 22 may be greater than an absolute value of a voltage between the main pixel electrode 11 and the common electrode 22, and the edge voltage source 12 may be configured to change the direction of edge electric field lines at the position of the dark fringe branch line 41 so as to eliminate the dark fringe branch line 41.

Figure 2:
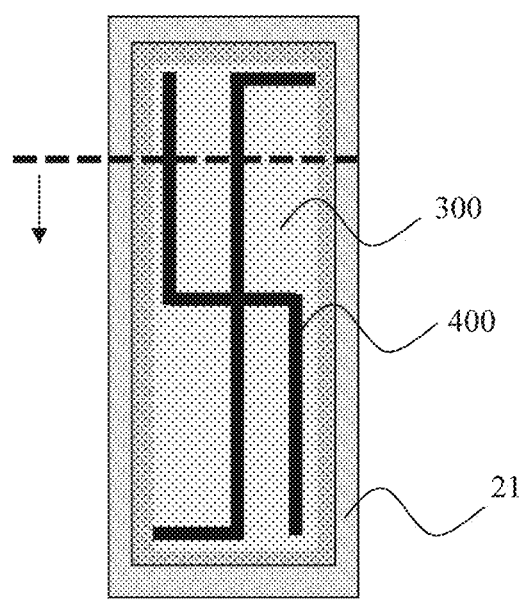
FIG. 2 is a structural schematic view of an alignment dark fringe within a pixel region provided in the prior art.
Figure 3:
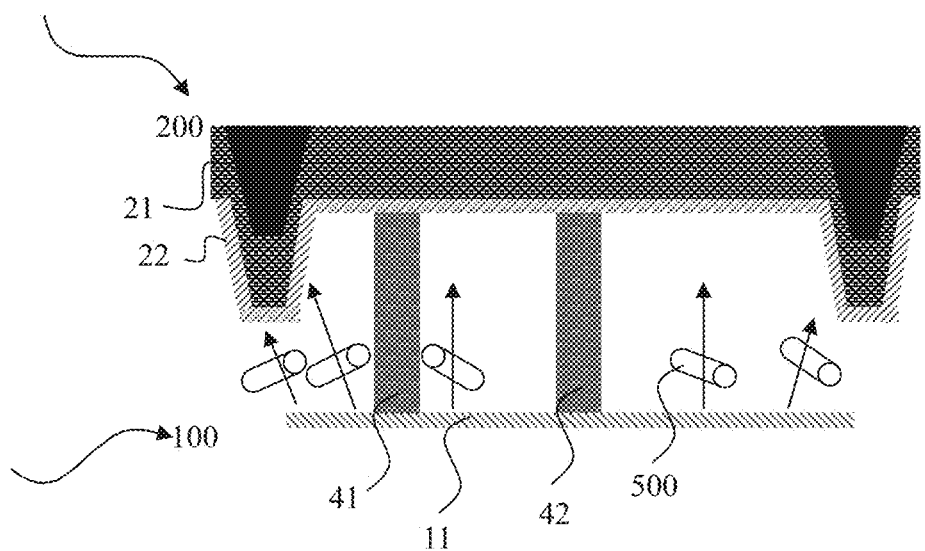
FIG. 3 is a cross-sectional view showing a structure of a liquid crystal display panel corresponding to FIG. 2.

In the above, as can be seen with reference to the prior art shown in FIGS. 1 to 3, directions of electric field lines in the vicinity of edge of the pixel region 300 within the pixel region 300 are obliquely diverged from the main pixel electrode 11 to the common electrode 22 at the black matrix 21, and an oblique electric field at the edge will cause liquid crystal molecules at the edge of the pixel region to form an arrangement form that is unfavorable for light transmission, i.e., to form the alignment dark fringe 400. Therefore, in cases where no edge voltage source 12 is added, the electric field lines at the edge of the pixel region 300 are subjected to the effect of the main pixel electrode 11, and the edge electric field lines are tilted in direction as indicated by an arrow pointing to an upper left direction in FIG. 4. In the present embodiment, the edge voltage source 12 is additionally provided on the array substrate 100, the main pixel electrode 11 may be mainly located within an opening region (or opening part) of the pixel region 300, and the edge voltage source 12 may be located at an edge position of the pixel region 300, and may be located below a raised horn-like structure formed by an overlapped part between a color filter and the black matrix 21 on the color filter substrate 200.

An absolute value of a voltage between the edge voltage source 12 and the common electrode 22 may be greater than an absolute value of a voltage between the main pixel electrode 11 and the common electrode 22. Taking the edge voltage source 12 being in positive polarity as an example, a transverse electric field corresponding to an arrow pointing to a horizontal direction as in FIG. 4 can be excited, and this transverse electric field and the tilted original edge electric field lines which are tilted can form a total electric field lines which are vertically upward by a vector recombination mechanism, so that the direction of the total electric field lines at the edge position of the pixel region 300 is consistent with the direction of the electric field lines at the opening part of the pixel region 300, i.e. they are all vertically upward, as shown by a direction of arrows of the electric field lines in FIG. 5. It can be understood that when the edge voltage source 12 is in negative polarity, corresponding electric field directions are opposite to the directions in FIG. 4, the direction of the total electric field lines formed after a vector recombination is vertically downward, the distribution trend of the electric field lines is unchanged, and the deflecting directions of the liquid crystal molecules are unchanged. Therefore, the arrangement of liquid crystal molecules in the entire pixel region 300 is more uniform, thereby the alignment dark fringe 400 at the edge position of the pixel region 300 can be eliminated.

It should be noted that the relation that the absolute value of the voltage between the edge voltage source 12 and the common electrode 22 is greater than the absolute value of the voltage between the main pixel electrode 11 and the common electrode 22 is only applicable when the liquid crystal display panel is in an operating state. When the liquid crystal display panel is off, the pixel region 300 may be in a light non-transmissive state, and the edge voltage source 12, the common electrode 22, the main pixel electrode 11 and the common electrode 22 each have an equal electric potential, at which time the liquid crystal molecules in the opening region of the entire pixel region 300 will not be deflected, thus the phenomenon of light leakage will not occur. Moreover, during charging and discharging processes of the edge voltage source 12 and the main pixel electrode 11, as charging and discharging rates may be different, there are a plurality of possibilities in the magnitudes of the absolute value of the voltage between the edge voltage source 12 and the common electrode 22, and the absolute value of the voltage between the main pixel electrode 11 and the common electrode 22.

Figure 6:
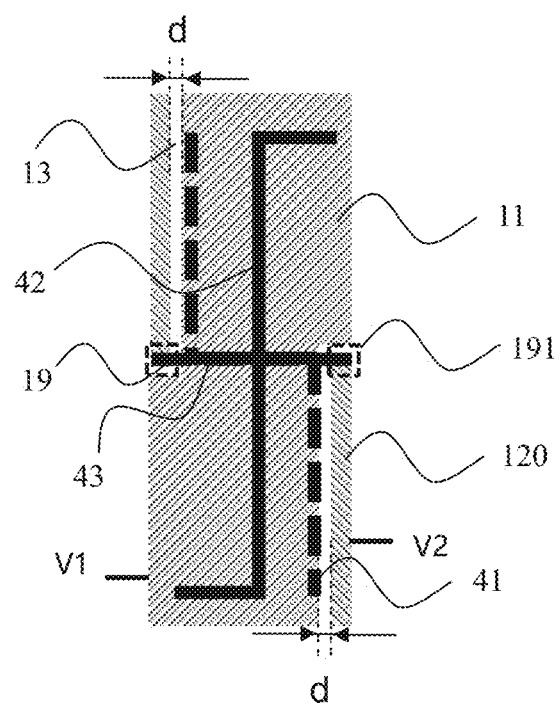
FIG. 6 is a structural schematic view of an array substrate and alignment dark fringe provided in an embodiment of the present disclosure.

FIG. 6 is a structural schematic view of an array substrate and an alignment dark fringe provided in an embodiment of the present disclosure, and referring to FIG. 6, the edge voltage source 12 may include a sub-pixel electrode 120, wherein each of the sub-pixel electrode 120 and the main pixel electrode 11 may be a transparent conductive thin film covering the array substrate 100.

In a feasible embodiment, the edge voltage source 12 may be a transparent conductive thin film covering the array substrate 100, i.e., the sub-pixel electrode 120 may have a structure and an operating principle similar to those of the main pixel electrode 11, and compared with other forms of voltage sources, the sub-pixel electrode has the advantages of structure simple and having less influences on the overall structure of the array substrate 100.

The sub-pixel electrode 120 may be located below the black matrix 21 and completely covered by the black matrix 21, wherein the main pixel electrode 11 and the sub-pixel electrode 120 may be independently arranged, and the main pixel electrode 11 may be driven by a main driving voltage V1 and the sub-pixel electrode 120 may be driven by a sub-driving voltage V2.

Further, a gap 13 may be formed between an edge of the main pixel electrode 11 and an edge of the sub-pixel electrode 120, wherein a center line in the width direction of the gap 13 may coincide with an edge line of the black matrix 21. The width of the gap 13 is d, wherein d may be in a range of 3-4 μm so as to ensure separation between the main pixel electrode 11 and the sub-pixel electrode 120 without affecting the overall area of the pixel region 100.

It should be noted that the edge line of the black matrix 21 herein may refer to an inner edge line of the black matrix 21, that is, an edge line of the black matrix 21 located inside one pixel region 300. And as shown in FIG. 4 and FIG. 5, the black matrix 21 is in an inverted trapezoidal shape, and the inner edge line may refer to an intersection line formed by an upper base with a larger width and legs of the inverted trapezoid shape.

As the width of the gap 13 between the edges of the main pixel electrode 11 and the sub-pixel electrode 120 is extremely small, and the pixel electrode is extremely thin, hardly affecting the alignment film, thus will not affect the alignment of the liquid crystal molecules, therefore, the existence of the sub-pixel electrode 120 and the gap 13 will not affect the light shading performance of the black matrix 21, and the phenomenon of light leakage will not occur.

Further, the polarity and timing (sequence) of voltages of the main pixel electrode 11 and the sub-pixel electrode 120 may be consistent with those of the voltage of the common electrode 22 on the color filter substrate 200, and the absolute value of the voltage of the sub-pixel electrode 120 may be higher than the absolute value of the voltage of the main pixel electrode 11, that is, the main driving voltage V1 is greater than the sub-driving voltage V2. Optionally, in the white state, the absolute value of the voltage of the sub-pixel electrode 120 may be no less than 1.5 times the absolute value of the voltage of the main pixel electrode 11. Such configuration ensures that a transverse electric field as shown in FIG. 4 which is excited by the sub-pixel electrode 120 can be large enough, and that the transverse electric field and the tilted original electric field lines at the edge form a vertically upward total electric field lines through a vector recombination mechanism.

Figure 7:
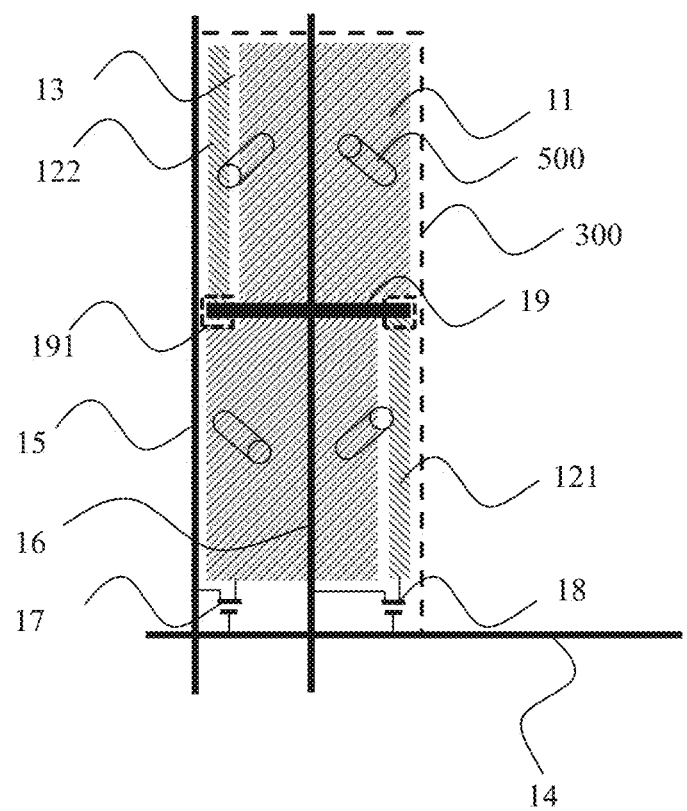
FIG. 7 is a structural schematic view of the array substrate provided in an embodiment of the present disclosure.
Figure 8:
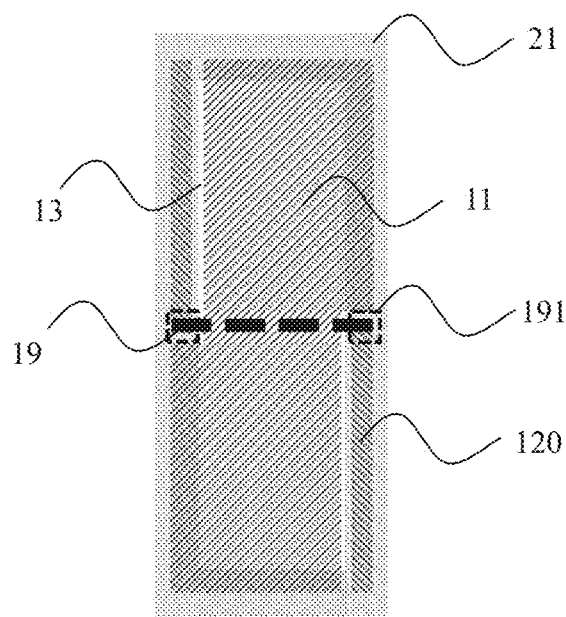
FIG. 8 is a structural schematic view of a pixel region and a pixel electrode provided in an embodiment of the present disclosure.

FIG. 7 is a structural schematic view of the array substrate provided in an embodiment of the present disclosure, FIG. 8 is a structural schematic view of a pixel region and a pixel electrode provided in an embodiment of the present disclosure, and referring to FIG. 7 and FIG. 8, a scan line 14 and a main data line 15 may be arranged on the array substrate 100, wherein a plurality of scan lines 14 and a plurality of main data lines 15 may be configured in a crossed manner to define a pixel region 300; the sub-pixel electrode 120 may be a strip-shaped electrode, and the strip-shaped electrode may be arranged close to the main data lines 15 and in parallel to the main data lines 15.

Generally, on the array substrate 100, a plurality of scan lines 14 may be arranged in parallel and extend in a first direction, a plurality of main data lines 15 may be arranged in parallel and extend in a second direction, the first direction and the second direction are configured in a crossed manner, and the plurality of scan lines 14 and the plurality of main data lines 15 may be configured in a crossed manner to define a plurality of pixel regions 300. Preferably, the first direction may be the horizontal direction in FIG. 7, and the second direction may be the vertical direction in FIG. 7.

In the four-domain vertical alignment technology, each pixel region 300 is divided into four domains with different alignments, so that the alignment dark fringe 400 formed within the pixel region is usually in shape of a clockwise swastika or counterclockwise swastika. The alignment dark fringe 400 includes a dark fringe branch line 41 at an edge of the pixel region 300 and a cross-shaped dark fringe main body at the center of the pixel region 300. In the above, there are four dark fringe branch lines 41, located at four edges of the pixel region 300, respectively, wherein two dark fringe branch lines extend in the direction of the scan lines 14 and are close to two adjacent scan lines 14, respectively, the other two dark fringe branch lines extend in the direction of the main data lines 15 and are close to two adjacent main data lines 15, and the four dark fringe branch lines 41 are centrosymmetric with respect to the cross-shaped dark fringe main body.

In the present embodiment, the sub-pixel electrode 120 may be a strip-shaped electrode, which may be close to the main data lines 15 and arranged parallel to the main data lines 15, and the sub-pixel electrode is configured to eliminate the dark fringe branch lines 41 extending along the direction of the main data lines 15 and close to the main data lines 15.

In a specific embodiment, referring to what is shown in FIG. 7, the main pixel electrode 11 and the sub-pixel electrode 120 can provide voltage signals through the main array switch 17 and the sub-array switch 18, respectively; the array substrate 100 may further be provided thereon with a sub-data line 16, wherein the sub-data line 16 may be located within the pixel region 300 and arranged parallel to the main data lines 15, gates of the main array switch 17 and the sub-array switch 18 may be connected with the same scan line 14, a source of the main array switch 17 may be connected with the main data line 15, and a source of the sub-array switch 18 may be connected with the sub-data line 16.

The main driving voltage V1 and the sub-driving voltage V2 can be provided by the main data line 15 and the sub-data line 16, respectively, and the main array switch 17 and the sub-array switch 18 can control, by signals of the scan lines 14, the charging timing of the main pixel electrode 11 and the sub-pixel electrode 120, respectively. Taking the common electrode as a voltage reference point, when the liquid crystal display panel is in an operating state, the main data line 15 and the sub-data line 16 may have consistent voltage polarity and timing, and the absolute value of the voltage of the sub-data line 16 may be greater than the absolute value of the voltage of the main data line 15. When the liquid crystal display panel is off, the absolute values of the voltages of the sub-data line 16 and the main data line 15 may be both zero.

Further, the alignment dark fringe 400 may further include a first dark fringe main line 42 located at a boundary of alignment domains at the center of the pixel region 300, wherein the first dark fringe main line 42 may be parallel to the main data line 15, and the sub-data line 16 may coincide with the first dark fringe main line 42.

When the sub-data line 16 is arranged within the pixel region 300, as it is a light shading metal layer, an aperture ratio of the pixel region 300 will be greatly affected. The sub-data line 16 is provided to coincide with the first dark fringe main line 42, and the first dark fringe main line 42, which itself has relatively low transmittance, is formed on an intersection line of the alignment domains, therefore, the influence of the sub-data line 16 on the aperture ratio can be reduced to the maximum extent.

Optionally, the sub-pixel electrode 120 may include a first sub-pixel electrode 121 and a second sub-pixel electrode 122 located at two sides of the pixel region 300, wherein the first sub-pixel electrode 121 and the second sub-pixel electrode 122 may be connected with a metal connection layer 19 through interlayer vias 191, respectively.

The first sub-pixel electrode 121 and the second sub-pixel electrode 122 may be located respectively at two sides of the pixel region 300 so as to eliminate the dark fringe branch lines 41 located at two sides of the pixel region 300, respectively. In order to simplify the wiring arrangement, the metal connection layer 19 may be provided to connect the first sub-pixel electrode 121 and the second sub-pixel electrode 122, and one of the first sub-pixel electrode 121 and the second sub-pixel electrode 122 may be connected with the sub-array switch 18.

Specifically, as the metal connection layer 19 is not in the same layer as the first sub-pixel electrode 121 and the second sub-pixel electrode 122, and they cannot be directly connected, it is necessary to provide the interlayer vias 191 so as to connect the metal connection layer 19 to the first sub-pixel electrode 121 and the second sub-pixel electrode 122, respectively.

Further, the alignment dark fringe 400 may further include a second dark fringe main line 43 located at a boundary of alignment domains at the center of the pixel region 300, the second dark fringe main line 43 may be parallel to the scan line 14, and the metal connection layer 19 may coincide with the second dark fringe main line 43.

When the metal connection layer 19 is arranged within the pixel region 300, as it is a light shading metal layer, an aperture ratio of the pixel region 300 will be greatly affected. The metal connection layer 19 is provided to coincide with the first second dark fringe main line 43, and the second dark fringe main line 43, which itself has relatively low transmittance, is formed on an intersection line of the alignment domains, therefore, the influence of the metal connection layer 19 on the aperture ratio can be reduced to the maximum extent.

On the basis of the above embodiments, optionally, the metal connection layer 19 and the scan lines 14 may be formed from the same metal in the same product process. Apart from the function of connecting the first sub-pixel electrode 121 and the second sub-pixel electrode 122, the metal connection layer 19 may also function as an electrode of storage capacitor, when it is provided to be formed from the same metal as the scan lines 14, so as to compensate for a drop in pixel electrode voltage, and improve display characteristics such as contrast of the liquid crystal display panel.

Figure 9:
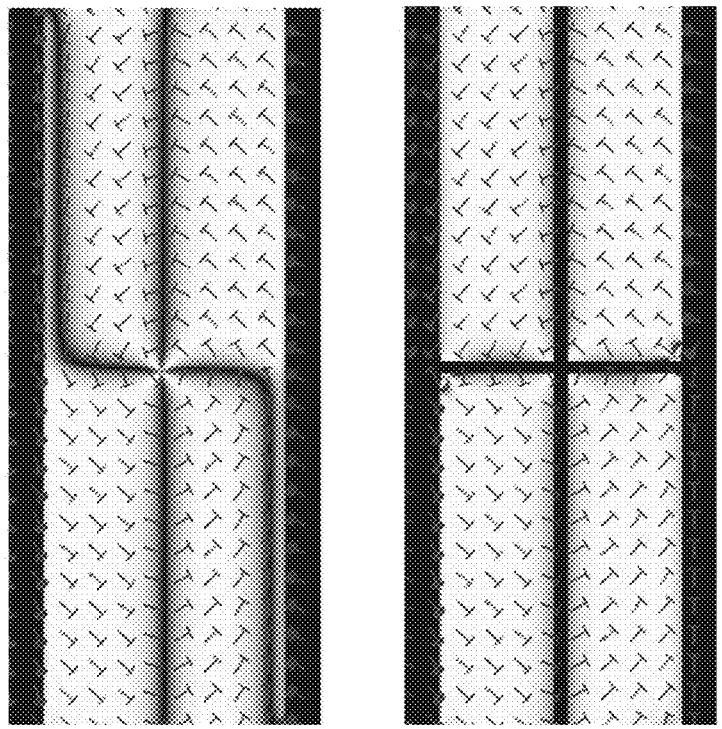
FIG. 9 is a comparative schematic view showing arrangement of liquid crystal molecules within a pixel region of the liquid crystal display panel in the prior art and those provided in an embodiment of the present disclosure.

FIG. 9 is a comparative schematic view showing arrangement of liquid crystal molecules within a pixel region of the liquid crystal display panel in the prior art and those provided in an embodiment of the present disclosure. Referring to FIG. 9, an arrangement of liquid crystal molecules within the pixel region of the liquid crystal display panel in the prior art is shown on the left side of FIG. 9, and an arrangement of liquid crystal molecules within the pixel region of the liquid crystal display panel provided in the embodiment of the present disclosure is shown on the right side of FIG. 9, and it can be seen obviously that compared with the prior art, the liquid crystal molecules are in a more ordered arrangement within the pixel region of the liquid crystal display panel provided in the embodiment of the present disclosure.

Figure 10:
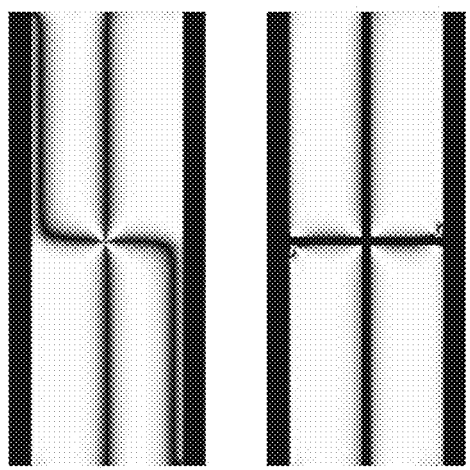
FIG. 10 is a comparative schematic view showing alignment dark fringes within a pixel region of the liquid crystal display panels in the prior art and those provided in an embodiment of the present disclosure.

FIG. 10 is a comparative schematic view showing alignment dark fringes within a pixel region of the liquid crystal display panel in the prior art and those provided in an embodiment of the present disclosure. Referring to FIG. 10, the alignment dark fringe within the pixel region of the liquid crystal display panel provided in the prior art is shown on the left side of FIG. 10, and the alignment dark fringe within the pixel region of the liquid crystal display panel provided in the embodiment of the present disclosure is shown on the right side of FIG. 10, and it can be seen obviously that compared with the prior art, the area of the alignment dark fringes is effectively reduced in the liquid crystal display panel provided in the embodiment of the present disclosure, such that the aperture ratio of the pixel region is obviously increased.

In the liquid crystal display panel provided in the embodiments of the present disclosure, an edge high-voltage source is added at the edge position of the pixel region so as to excite an additional electric field, the additional electric field and the original edge electric field lines form the total electric field having the direction consistent to that of the electric field of the opening part by the vector recombination mechanism, so that the liquid crystal molecules are in a more ordered arrangement, part of the alignment dark fringes at the edge positions of the pixel region thus can be eliminated, and the overall transmittance of the liquid crystal display panel is improved.

In the description of the present disclosure, it should be understood that orientational or positional relations indicated with use of terms "center", "length, "width", "thickness", "top end", "bottom end", "upper", "lower", "left", "right", "front", "back", "vertical", "horizontal", "inner", "outer", "axial", "circumferential" and so on are based on orientational or positional relations as shown in the accompanying drawings, merely for facilitating the description of the present disclosure and simplifying the description, rather than indicating or implying that related position or elements have to be in the specific orientation, or specifically configured and operated, therefore, they should not be construed as limitation on the present disclosure.

Besides, terms "first" and "second" are merely used for descriptive purpose, but should not be construed as indicating or implying relative importance or suggesting the number of a related technical feature. Thus, a feature defined with "first" or "second" may explicitly or implicitly mean that one or more such features are included. In the description of the present disclosure, "multiple (a plurality of)" means at least two, for example, two or three, unless otherwise explicitly defined.

In the present disclosure, unless otherwise explicitly specified and defined, terms such as "mount", "join", "connect" and "fix" should be construed in a broad sense. For example, it may be fixed connection, detachable connection, or integral connection; it may be mechanical connection, and also may be electrical connection or may be communicated with each other; it may be direct connection, indirect connection through an intermediate medium, or inner communication between two elements or interaction between two elements. For those ordinarily skilled in the art, specific meanings of the above-mentioned terms in the present disclosure can be understood according to specific circumstances.

In the present disclosure, unless otherwise specified and defined explicitly, a first feature being "above" or "below" a second feature may include the first feature and the second feature being in direct contact, and also may include the first feature and the second feature being not in direct contact but being in contact via another feature therebetween. Moreover, the first feature being "on", "above" or "over" the second feature includes the first feature being right above or not right above the second feature, or merely means the level of the first feature being higher than that of the second feature. The first feature being "under", "below" or "beneath" the second feature includes the first feature being directly below or not directly below the second feature, or merely means the level of the first feature being lower than that of the second feature.

Finally, it should be explained that various embodiments above are merely used for illustrating the technical solutions of the present disclosure, rather than limiting the present disclosure; while the detailed description is made to the present disclosure with reference to various preceding embodiments, those ordinarily skilled in the art should understand that they still could modify the technical solutions recited in various preceding embodiments, or make equivalent substitutions to some or all of the technical features therein; these modifications or substitutions do not make the corresponding technical solutions essentially depart from the scope of the technical solutions of various embodiments of the present disclosure.

INDUSTRIAL APPLICABILITY

In summary, the present disclosure provides a liquid crystal display panel and a preparation method thereof, wherein by adding the edge high-voltage source at the edge position of the pixel region so as to excite the additional electric field, the additional electric field and the original edge electric field lines, form the total electric field having the direction consistent to that of the electric field at the opening part under the vector recombination mechanism, so that the liquid crystal molecules are in a more ordered arrangement, part of the alignment dark fringe at the edge position of the pixel region thus can be eliminated, and the overall transmittance of the liquid crystal display panel is improved.

What is claimed is:

1. A liquid crystal display panel, comprising: an array substrate and a color filter substrate arranged opposite to each other; wherein the array substrate and the color filter substrate are correspondingly provided with a pixel region, during display the pixel region has an alignment dark fringe caused by photo-alignment, and the alignment dark fringe comprises a dark fringe branch line located at an edge of the pixel region wherein the color filter substrate is provided with a common electrode and a black matrix configured to define the pixel region, the array substrate is further provided thereon with a main pixel electrode and an edge voltage source, the edge voltage source is located at an edge of the pixel region and below the black matrix, an absolute value of a voltage between the edge voltage source and the common electrode is greater than an absolute value of a voltage between the main pixel electrode and the common electrode, and the edge voltage source is configured to change a direction of edge electric field lines at the position of the dark fringe branch line so as to eliminate the dark fringe branch line.

2. The liquid crystal display panel according to claim 1, wherein the color filter substrate is further provided thereon with a color filter, an overlapped part between the color filter and the black matrix forms a raised horn-like structure, and the edge voltage source is located below the horn-like structure.

3. The liquid crystal display panel according to claim 1, wherein the edge voltage source comprises a sub-pixel electrode; and each of the sub-pixel electrode and the main pixel electrode is a transparent conductive thin film covering the array substrate.

4. The liquid crystal display panel according to claim 3, wherein the sub-pixel electrode is completely covered by the black matrix.

5. The liquid crystal display panel according to claim 3, wherein a gap is formed between an edge of the main pixel electrode and an edge of the sub-pixel electrode, and a center line in a width direction coincides of the gap with an edge line of the black matrix.

6. The liquid crystal display panel according to claim 5, wherein the edge line of the black matrix is an inner edge line of the black matrix located inside the pixel region.

7. The liquid crystal display panel according to claim 5, wherein the black matrix is in an inverted trapezoidal shape, and the edge line of the black matrix is an intersection line formed by an upper base having a larger width and legs of the inverted trapezoid shape.

8. The liquid crystal display panel according to claim 3, wherein polarity and timing of voltage of each of the main pixel electrode and the sub-pixel electrode are consistent with polarity and timing of the voltage of the common electrode; and an absolute value of the voltage of the sub-pixel electrode is higher than an absolute value of the voltage of the main pixel electrode.

9. The liquid crystal display panel according to claim 8, wherein in a white state, the absolute value of the voltage of the sub-pixel electrode is no less than 1.5 times the absolute value of the voltage of the main pixel electrode.

10. The liquid crystal display panel according to claim 3, wherein the array substrate is provided thereon with scan lines and main data lines, a plurality of the scan lines and a plurality of the main data lines are arranged in a crossed manner to define the pixel region; and
wherein the sub-pixel electrode is a strip-shaped electrode, and the strip-shaped electrode is arranged close to the respective main data line and in parallel to the main data lines.

11. The liquid crystal display panel according to claim 10, wherein the main pixel electrode provides voltage signal by the main array switch and the sub-pixel electrode provides voltage signal by the sub-array switch; and
the array substrate is further provided thereon with a sub-data line, the sub-data line is located within the pixel region and arranged parallel to the main data lines, gates of the main array switch and the sub-array switch are connected with a same scan line, a source of the main array switch is connected with the main data line, and a source of the sub-array switch is connected with the sub-data line.

12. The liquid crystal display panel according to claim 11, wherein the alignment dark fringe further comprises a first dark fringe main line located at a boundary of alignment domains at the center of the pixel region, the first dark fringe main line is parallel to the main data lines, and the sub-data line coincides with the first dark fringe main line.

13. The liquid crystal display panel according to claim 10, wherein the sub-pixel electrode comprises a first sub-pixel electrode and a second sub-pixel electrode located at two sides of the pixel region, and the first sub-pixel electrode and the second sub-pixel electrode are respectively connected with a metal connection layer through interlayer vias.

14. The liquid crystal display panel according to claim 13, wherein the alignment dark fringe further comprises a second dark fringe main line located at a boundary of alignment domains at the center of the pixel region, the second dark fringe main line is parallel to the scan lines, and the metal connection layer coincides with the second dark fringe main line.

15. The liquid crystal display panel according to claim 13, wherein the metal connection layer and the scan lines are formed from a same metal in a same product process.

16. A preparation method for a liquid crystal display panel, comprising steps of:
providing an array substrate and a color filter substrate arranged opposite to each other, correspondingly providing a pixel region on the array substrate and the color filter substrate, wherein during display the pixel region has an alignment dark fringe caused by photo-alignment, and the alignment dark fringe comprises a dark fringe branch line located at an edge of the pixel region;
providing on the color filter substrate a common electrode and a black matrix which is configured to define the pixel region; and
further providing a main pixel electrode and an edge voltage source on the array substrate, wherein the edge voltage source is disposed at the edge of the pixel region and below the black matrix, and when in use, an absolute value of a voltage between the edge voltage source and the common electrode is greater than an absolute value of a voltage between the main pixel electrode and the common electrode, and the edge voltage source is configured to change a direction of edge electric field lines at a position of the dark fringe branch line so as to eliminate the dark fringe branch line.

17. The preparation method according to claim 16, wherein a color filter is further provided on the color filter substrate, such that an overlapped part between the color filter and the black matrix forms a raised horn-like structure, and the edge voltage source is disposed at an edge position of the pixel region and located below the horn-like structure.

18. The preparation method according to claim 16, wherein the edge voltage source is provided to comprise a sub-pixel electrode, and each of the sub-pixel electrode and the main pixel electrode is provided as a transparent conductive thin film covering the array substrate.

19. The preparation method according to claim 18, wherein the sub-pixel electrode is provided to be completely covered by the black matrix.

20. The preparation method according to claim 19, wherein a gap is provided between an edge of the main pixel electrode and an edge of the sub-pixel electrode, and a center line in a width direction of the gap is provided to coincide with an edge line of the black matrix.

* * * * *